United States Patent [19]

Kadota

[11] Patent Number: 4,790,366
[45] Date of Patent: Dec. 13, 1988

[54] PNEUMATIC RADIAL TIRE FOR HEAVY DUTY VEHICLE

[75] Inventor: Kuninobu Kadota, Kodaira, Japan

[73] Assignee: Bridgestone Corporation, Tokyo, Japan

[21] Appl. No.: 791,527

[22] Filed: Oct. 25, 1985

[30] Foreign Application Priority Data

Nov. 16, 1984 [JP] Japan ................. 59-241840
Jul. 1, 1985 [JP] Japan ................. 60-145310

[51] Int. Cl.$^4$ ............................................. B60C 15/06
[52] U.S. Cl. ........................... 152/543; 152/541; 152/546
[58] Field of Search ............. 152/540, 543, 546, 548, 152/553, 554, 541

[56] References Cited

U.S. PATENT DOCUMENTS

| | | | |
|---|---|---|---|
| 4,185,677 | 1/1980 | Motomura et al. | 152/546 X |
| 4,215,737 | 8/1980 | Motomura et al. | 152/543 |
| 4,234,029 | 11/1980 | Peter et al. | 152/543 X |
| 4,265,292 | 5/1981 | Inoue | 152/543 X |
| 4,289,184 | 9/1981 | Motomura et al. | 152/543 X |
| 4,319,621 | 3/1982 | Motomura et al. | 152/541 X |
| 4,398,584 | 8/1983 | Tansei et al. | 152/543 |

FOREIGN PATENT DOCUMENTS

| | | |
|---|---|---|
| 433757 | 6/1970 | Australia . |
| 478962 | 8/1976 | Australia . |
| 502032 | 1/1978 | Australia . |
| 513300 | 1/1979 | Australia . |
| 0124617 | 11/1984 | European Pat. Off. . |
| 1470828 | 4/1977 | United Kingdom . |
| 1477858 | 4/1977 | United Kingdom . |
| 2036665 | 7/1980 | United Kingdom . |
| 1592122 | 7/1981 | United Kingdom . |
| 2065573 | 7/1981 | United Kingdom . |
| 2127361 | 4/1984 | United Kingdom ................. 152/543 |

Primary Examiner—Michael W. Ball
Assistant Examiner—Ramon R. Hoch
Attorney, Agent, or Firm—Cushman, Darby & Cushman

[57] ABSTRACT

In a pneumatic radial tire for heavy duty vehicles having a pair of bead portions, each of the bead portions comprises at least first, second and third chafer plies disposed around the carcass. The third chafer ply has a cord angle larger than those of the first and second chafer plies. The first, second and third chafer plies have a first chafer height $h_1$ measured in the radial direction from a laterally outward and radially outermost end of the first chafer ply to a heel point at which a bead base of the bead portion and a flange portion of a rim having mounted the bead base thereon are intersected with each other, a second chafer height $h_2$ and a third chafer height $h_3$, respectively. The carcas has a fold-back height H measured in the radial direction from a radially outermost end of the fold-back portion thereof to the heel point, the first, second and third chafer heights $h_1$, $h_2$ and $h_3$ being selected within ranges defined by the following equations, $$1 < \frac{h_1}{H} \leq 2.0, \quad 1 < \frac{h_2}{H} \leq 2.0, \quad \frac{h_3}{H} \leq 2.5.$$

The third chafer height $h_3$ is taller than the other chafer heights $h_1$ and $h_2$.

7 Claims, 7 Drawing Sheets

PNEUMATIC RADIAL TIRE FOR HEAVY DUTY VEHICLE

FIELD OF THE INVENTION

The present invention relates to an improvement of a bead portion of a pneumatic radial tire for heavy duty vehicles. More particularly, the present invention relates to an improvement of chafer plies of the bead portion.

In accordance with one important aspect of the present invention, there is provided a pneumatic radial tire for heavy duty vehicles having a pair of bead portions each comprising a bead core disposed circumferentially of the tire on a plane which is substantially perpendicular to a rotational axis of the tire, a rubber stiffener disposed radially outwardly of the bead core and shaped in the form of a triangle in cross section, at least one carcass having a fold-back portion folding back at the bead core in a radial direction substantially perpendicular to the rotational axis to cover the bead core and in part the rubber stiffener, and at least first, second and third chafer plies disposed around the carcass to reinforce the bead portions and having embedded therein a plurality of first parallel cords, a plurality of second parallel cords and a plurality of third parallel cords, respectively, two adjacent cords of the first, second and third cords crossing one another, the cords of the first, second and third chafer plies extending with respect to the radial direction at chafer angles of $\theta_1$, $\theta_2$ and $\theta_3$, respectively, defined by the following equations, $$35° \leq \theta_1 \leq 55°,$$

$$35° \leq \theta_2 \leq 55°$$

$$70° \leq \theta_3 < 90°$$

the first, second and third chafer plies having a first chafer height $h_1$ measured in the radial direction from a laterally outward and radially outermost end of the first chafer ply to a heel point at which a bead base of the bead portion and a flange portion of a rim having mounted the bead base thereon are intersected with each other, a second chafer height $h_2$ measured in the radial direction from a laterally outward and radially outermost end of the second chafer ply to the heel point and a third chafer height $h_3$ measured in the radial direction from an a laterally outward and radially outermost end of the third chafer ply to the heel point, respectively, the carcass having a fold-back height H measured in the radial direction from a radially outermost end of the fold-back portion thereof to the heel point, the first, second and third chafer heights $h_1$, $h_2$ and $h_3$ being selected within ranges defined by the following equations, $$1 < \frac{h_1}{H} \leq 2.0, \ 1 < \frac{h_2}{H} \leq 2.0, \ \frac{h_3}{H} \leq 2.5,$$

the third chafer height $h_3$ being taller than the other chafer heights $h_1$ and $h_2$.

DESCRIPTION OF THE PRIOR ART

A prior art pneumatic radial tire for heavy duty vehicles is shown in part in FIG. 17 of the drawings. The pneumatic radial tire has a lateral direction A' substantially parallel to a rotational axis (not shown) thereof and a radial direction R substantially perpendicular to the lateral direction A'. A bead portion generally designated by reference numeral 31 comprises a bead core 32 disposed circumferentially of the tire on a plane which is substantially perpendicular to the lateral direction A', a rubber stiffener 33 disposed radially outwardly of the bead core 32, a carcass 34 having at least one ply of rubberized steel cords and covering the rubber stiffener 33 and the bead core 32 and folding back at the bead core 32 in the radial direction R, and a chafer 36 disposed around the carcass 34 for reinforcing surroundings of the carcass 34. The chafer 36 consists of three chafer plies 36a, 36b and 36c of textile cords of 1260 denier/2. The number of the cords is 41.4 pieces/50 mm. The chafer plies 36a and 36b extend radially inwardly from the vicinity of the rubber stiffener 33 between the carcass 34 and an inner surface 31a of the bead portion 31 and fold back at the bead core 32 in the radial direction R, while the outermost chafer ply 36c extends radially outwardly from a bead base 37 of the bead portion 31 along an outer surface 31b of the bead portion 31. A cord angle of each of 36a, 36b and 36c is approximately 60° with respect to the radial direction R and two adjacent chafer plies of the three plies are disposed so as to cross one another.

In a pneumatic tubeless radial tire having the bead portion 31 constructed as hereinabove described, the bead portion 31 is not reinforced satisfactory by the chafer plies because the cords of the chafer plies extend at an angle of 60° with respect to the radial direction R. Particularly, in the case that a heavy duty vehicle equipped with the tire having the bead portion 31 travels on a road under high load condition and the tread portion is repaired several times, the durability of the bead portion 31 becomes insufficient and consequently there has been the drawback that the bead portion 31 cracks from laterally inwardly to outwardly, as shown at 35, viz., from a radially uppermost end 34a of the carcass 34 to the chafer plies 36a, 36b and 36c. In order to reinforce the bead portion 31 to prevent the cracks, it is possible to increase the number of the chafer plies of the chafer 8. However, if the bead portion 31 is enlarged in the lateral direction A', heat generated in the bead portion is proportionally increased, so that the durability of the bead portion 31 become insufficient. It is also possible to reinforce the bead portion 31 by increasing the number of the innermost and intermediate chafer plies 36a and 36b folding back at the bead core 32. In this case, since the bead portion 31 is enlarged in the radial direction R between the bead core 32 and the bead base 37, the resistance to durability is also necessarily lowered at the inside of the bead core 32. For this reason, when the bead portion 31 is assembled on a rim 38 for tubeless tires, there has been another drawback that the bead portion 31 may be dislocated from a flange portion 39 of the rim 38 by external force because height F of the flange portion 39 of the rim 38 for tubeless tires is smaller than that of a flange portion of a rim for tube tires.

It is, accordingly, an object of the present invention to provide an improved pneumatic tubeless radial tire in which the bead portion thereof is enhanced in durability and capable of being used under high load even after the tread portion is repaired several times, by arranging properly angles of the cords of the chafer plies reinforcing the bead portion to inhibit deformations produced in the bead portion due to the high load and to obtain sufficient reinforcing effect.

BRIEF DESCRIPTION OF THE DRAWINGS

The drawbacks of the prior art pneumatic radial tire for heavy duty vehicles and the desirable features and advantages of a pneumatic radial tire for heavy duty vehicles constructed in accordance with the present invention will be more fully understood from a consideration of the following detailed description in conjunction with accompanying drawings, in which.

DESCRIPTION OF THE PREFERRED EMBODIMENTS

Figure 1:
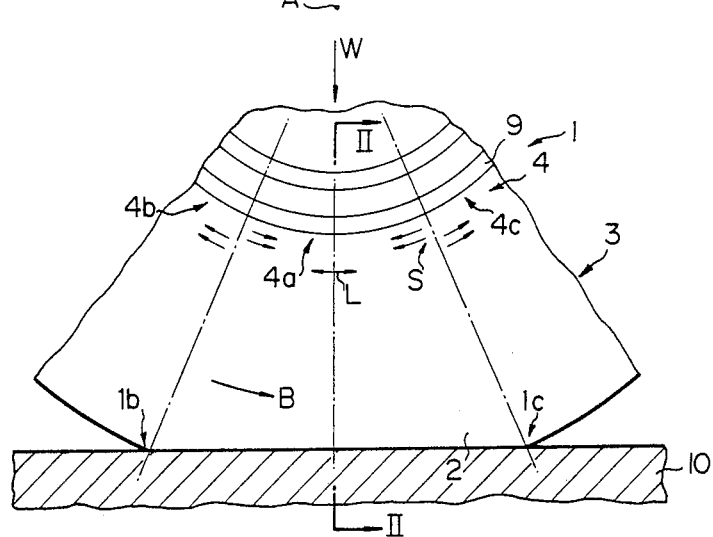
FIG. 1 is a part-side view, generally schematic in form, showing deformations and stresses of a pneumatic radial tire for heavy duty vehicles which is subjected to concentrated load in a direction substantially perpendicular to a rotational axis of the radial tire.
Figure 2:
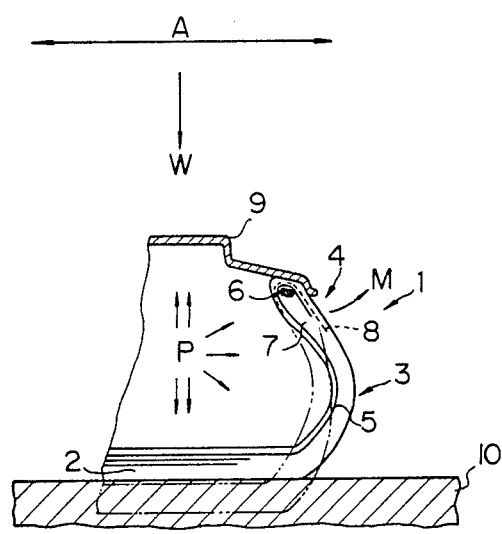
FIG. 2 is a part-sectional view taken substantially along line II—II indicated in FIG. 1.

FIGS. 1 and 2 of the drawings illustrate diagrammatically deformations and stresses of a pneumatic tubeless radial tire 1 for heavy duty vehicles which is subjected to concentrated load W in a radial direction substantially perpendicular to a rotational axis A of the pneumatic tubeless radial tire. The pneumatic tubeless radial tire 1 (hereinafter referred to as "a radial tire") shown there comprises a tread portion 2 extending circumferentially thereabout, a pair of side portions 3, a pair of bead portions 4 and a carcass 5 extending between the bead portions 4. The bead portion 4 comprises a bead core 6 and a rubber stiffener 7 at a central portion thereof. The carcass 5 folds back at the bead core 6 and terminates in the vicinity of the rubber stiffener 7 to reinforce the bead core 6. Surroundings of the carcass 5 is further reinforced by a chafer 8. The radial tire 1 under normal pressure P is deformed as shown by solid lines indicated in FIG. 2 from phantom lines when subjected to the concentrated load W in the radial direction substantially perpendicular to the rotational axis A of the radial tire 1 through a rim 9 on which the bead portion 4 is assembled. Assuming that the radial tire 1 rotates in a direction indicated by arrow B in FIG. 1 and contacts at a fore tread-on portion 1b and an aft tread-on portion 1c of the tread portion 2 with a substantially flat floor 10, the deformations produced in the bead portion 4 are mainly the following two kinds.

(1) One kind is bending deformations produced between a bead portion 4a (FIG. 1) directly subjected to the load W and the side portion 3. The bead portion 4a is deformed from laterally inwardly to outwardly, viz., in a direction indicated by arrow M in FIG. 2 by bending moment resulting from the concentrated load W acting on the radial tire 1.

(2) Another is shearing deformations produced in a circumferential direction L of the radial tire 1 between a bead portion 4b secured on the rim 9 and the fore tread-on portion 1b of the tread portion 2 brought into contact with the floor 10 and between a bead portion 4c secured on the rim 9 and the aft tread-on portion 1c of the bead tread portion 2 brought into contact with the floor 10. The bead portions 4b and 4c are deformed in directions indicated by arrows S in FIG. 2.

Hence, in order to increase reinforcing effect of the bead portion 4 and enhance durability of the bead portion 4, it is required to minimize the above noted bending and shearing deformations and accordingly internal strains resulting from the bending and shearing deformations. It is thus desirable to arrange properly angles of the cords of the chafer 8 in directions inhibiting the internal strains.

Due to the bending deformation, the bead portion 4a directly subjected to the load W is deformed, as noted above, in the direction M, and the bead portion 4 is further deformed in the directions S because of the shearing deformation. Accordingly, in order to minimize the bending deformation, it is most effective to increase circumferential rigidity of the bead portion 4. It is also most effective to increase shearing rigidity of the bead portion 4 to minimize the shearing deformation.

The description will hereinafter be made regards as how the circumferential and shearing rigidities of the bead portion 4 vary depending upon variation of a cord angle, viz., chafer angle of the chafer 8 with respect to the radial direction substantially perpendicular to the rotational axis A of the radial tire 1.

Figure 3:
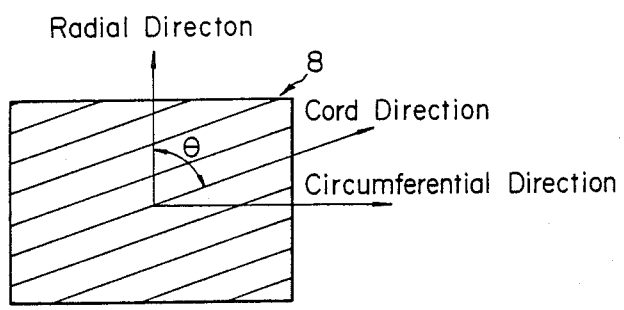
FIG. 3 shows a chafer angle at which cords of a chafer ply extend with respect to the radial direction and relationship between the radial direction and a circumferential direction of the radial tire.
Figure 4:
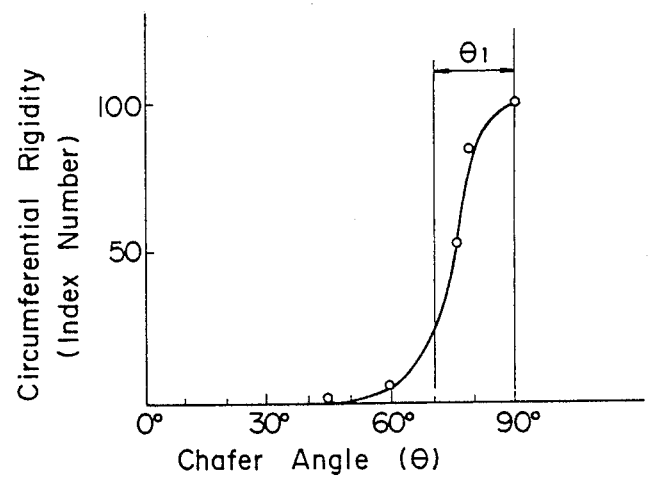
FIG. 4 shows how circumferential rigidity of a bead portion of the radial tire shown in FIG. 1 varies depending upon variation of the chafer angle.
Figure 5:
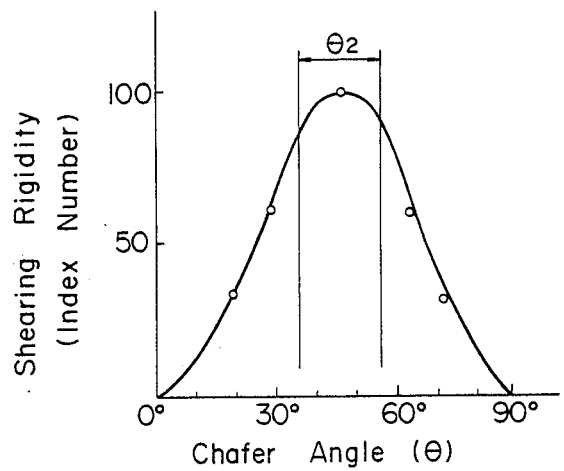
FIG. 5 shows how shearing rigidity of the bead portion varies depending upon variation of the chafer angle.

FIG. 3 shows the chafer angle denoted by reference 8 and relationship between the radial and circumferential directions. FIG. 4 shows how the circumferential rigidity of the bead portion 4 varies depending upon variation of the chafer angle $\theta$. The maximum value of the circumferential rigidity is indicated as 100 by an index number. FIG. 5 shows how the shearing rigidity of the bead portion 4 varies depending upon variation of the chafer angle 8. The maximum value of the shearing rigidity is also indicated as 100 by an index number. As can be readily appreciated from FIG. 4, in the case the chafer angel $\theta$ is between 70° and 90°, viz., $\theta_1$, the circumferential rigidity of the bead portion 4 is relatively high and consequently the inhibition of the bending deformation is most effective. It can also be readily appreciated from FIG. 5 that in the case the chafer angel 8 is between 35° and 55°, viz., $\theta_2$, the shearing rigidity of the bead portion 4 is substantially highest and consequently the inhibition of the shearing deformation is most effective. The circumferential and shearing rigidities of the bead portion 4 can be made high simultaneously from the foregoing results by employing at least two chafer plies one of which has the chafer angle $\theta_1$ ranging from 70° to 90° and the other of which has the chafer angle $\theta_2$ ranging from 35° to 55°.

The bead portion 4 of a pneumatic radial tire for heavy duty vehicles constructed in accordance with the present invention will now be described in detail in conjunction with the results hereinabove described and the accompanying drawings.

Figure 6:
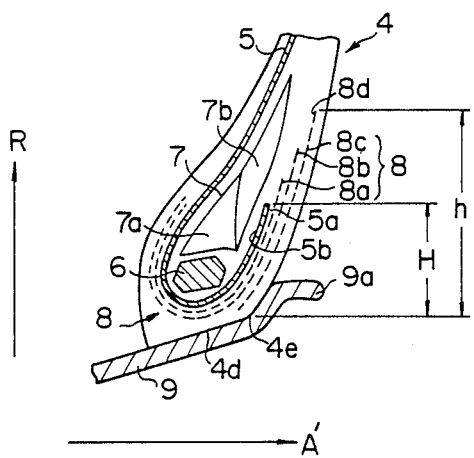
FIG. 6 is an enlarged part-sectional view showing a first preferred embodiment of a bead portion of the pneumatic radial tire for heavy duty vehicle constructed in accordance with the present invention.

Referring to FIG. 6, the bead portion 4 shown there comprises the bead core 6 disposed circumferentially of the tire on a plane which is substantially perpendicular to a lateral direction A' (which is substantially parallel to the rotational axis of the tire), the rubber stiffener 7 disposed radially outwardly of the bead core 6, and at least one carcass 5 having a fold-back portion 5b folding back at the bead core 6 in a radial direction R substantially perpendicular to the lateral direction A' to cover the bead core 6 and in part the rubber stiffener 7. The rubber stiffener 7 is shaped in the form of a triangle in cross section and comprises a lower rubber stiffener 7a disposed on the bead core 6 and an upper rubber stiffener 7b disposed on the lower rubber stiffener 7a. The fold-back portion 5b of the carcass 5 has a radially outermost end 5a disposed adjacent the upper rubber stiffener 7b. Modulus of elasticity of the upper rubber stiffener 7b is smaller than that of the lower rubber stiffener 7a.

The chafer 8 is disposed around the carcass 5 of the bead portion 4 to reinforce the bead portion 4. The chafer 8 comprises first or innermost, second or intermediate and third or outermost chafer plies 8a, 8b and 8c which have embedded therein a plurality of first parallel cords, a plurality of second parallel cords and a plurality of third parallel cords, respectively. Two adjacent cords of the first, second and third cords cross one another. The first, second and third cords of the chafer plies 8a, 8b and 8c extend with respect to the radial direction R at angles of $\theta_1$, $\theta_3$ and $\theta_2$, respectively, defined by the following equations, $$70° \leq \theta_1 < 90°$$

$$35° \leq \theta_2 \leq 55°$$

wherein the angle $\theta_1$ indicates the chafer angle of the innermost chafer ply 8a disposed adjacent the carcass 5 and the angle $\theta_2$ indicates the chafer angle of the outermost chafer ply 8c. The angle $\theta_3$ of the intermediate chafer ply 8b is selected between the chafer angles $\theta_1$ of the innermost chafer ply 8a and $\theta_2$ of the outermost chafer ply 8c. The chafer angle of each of the chafer plies 8a, 8b and 8c is thus selected to be gradually decreased from the innermost ply 8a to the outermost ply 8c so that the rigidities of the chafer plies 8a, 8b and 8c vary smoothly from the innermost ply 8a to the outermost ply 8c. Such variation of the chafer angle is preferred. In the case the chafer angle is less than 70°, the circumferential rigidity of the bead portion 4 is extremely low as shown in FIG. 4 and consequently the bending deformation becomes large. The chafer angle more than 90° is not suitable for practical use. In the case the chafer angle is less than 35° and more than 55°, the shearing rigidity of the bead portion 4 is relatively low as shown in FIG. 5 and not sufficient to inhibit the shearing deformation.

A chafer height designated by reference h in FIG. 6 is a distance measured in the radial direction R from a radially outermost end 8d of the outermost chafer ply 8c to a heel point 4e at which the bead base 4d of the bead portion 4 and the flange portion 9a of the rim 9 are intersected with each other. A fold-back height designated by reference H is a distance measured in the radial direction R from the radially outermost end 5a of the fold-back portion 5b of the carcass 5 to the heel point 4e. The chafer height h is preferable to be selected within ranges defined by equation $$h/H = 1 \sim 2.5$$

wherein the H indicates a fold-back height measured in the radial direction R from the radially outermost end 5a of the fold-back portion 5b thereof to the heel point 4e.

Regards as the equation $h/H = 1 \sim 2.5$, in the case the h/H ratio is less than 1, the radially outermost end 5a of the fold-back portion 5b of the carcass 5 is not reinforced satisfactory by the chafer plies 8a, 8b and 8c because the radially outermost end 5a extends ahead of the radially outermost end 8d of the outermost chafer ply 8c. Cracks will therefore occur at the radially outermost end 5a of the fold-back portion 5b of the carcass 5. In the case the h/H ratio is more than 2.5, the radially outermost end 8d of the outermost chafer ply 8c enters the region in which the large deformation of the tire is produced. As a consequence, cracks occurs from the the radially outermost end 8d of the outermost chafer ply 8c of the chafer 8.

The description will now be made in detail regards as operation for the bead portion constructed in accordance with the present invention.

Assuming that the radial tire 1 with the bead portion 4 is employed in a heavy duty vehicle and the vehicle travels on a road under high load condition after the tread portion 2 thereof is repaired several times, the radial tire 1 is subjected to the high load repeatedly during travelling of the heavy duty vehicle. Due to the repeated high load, the bending deformations are produced in the direction M indicated in FIG. 2 between the bead portion 4a and the side portion 3 and the shearing deformations are produced in the circumferential direction L of the tire between the bead portion 4b and the fore tread-on portion 1b of the tread portion 2 and between the bead portion 4c and the aft tread-on portion 1c of the tread portion 2.

The bead portion 4 constructed in accordance with the present invention is, however, provided with the chafer plies 8a, 8b and 8c the cords of each of which cross one another to minimize the deformations. More particularly, the chafer angle $\theta_1$ of the innermost chafer ply 8a ranges from 70° to 90° with respect to the radial direction R to provide relatively higher circumferential rigidity. Hence, the bead portion 4 is prevented from being largely deformed laterally outwardly in the direction M (FIG. 2). In addition, the chafer angle $\theta_2$ of the outermost chafer ply 8c ranges 35° to 55° with respect to the radial direction R to provide maximum shearing rigidity. Hence, the bead portion 4 is prevented from being largely deformed in the circumferential direction L of the tire. Accordingly, the reinforcing effect of the bead portion is enhanced effectively at the same time by employing at least two chafer plies one of which has the chafer angle $\theta_1$ ranging from 70° to 90° and the other of which has the chafer angle $\theta_2$ ranging from 35° to 55°.

As noted above, the ratio of the chafer height h of the chafer 8 to the fold-back height H of the carcass 5 is selected to be within 1 to 2.5 and the radially outermost end 8d of the outermost chafer ply 8c of the chafer 8 and the radially outermost end 5a of the fold-back portion 5b of the carcass 5 are both disposed in the region in which cracks will seldomly occur. Accordingly, the cracks will not occur at the radially outermost end 8d of the outermost chafer ply 8c and the radially outermost end 5a of the fold-back portion 5b of the carcass 5. In addition, the innermost chafer ply 8a is provided adjacent the carcass 5 and the chafer angle $\theta_1$ thereof is the angle $\theta_1$ which is closer the circumferential direction of the tire than the cord direction of the carcass 5 being disposed substantially in the radial direction, more particularly, the number of the cords of the innermost chafer ply 8a is increased gradually along the radial direction. For this arrangement, the radially outermost end 5a of the carcass 5 is protected effectively by the innermost chafer ply 8a and thus the durability of the bead portion 4 is enhanced extremely.

Although the rubber stiffener 7 for reinforcing the bead portion 4 is deformed remarkably because of the above noted bending and shearing deformations, the bending deformation is produced smoothly in the rubber stiffener 7 and concentration of the stresses produced is prevented not so as to have a negative effect on the reinforcement of the bead portion 4 by reason that the rubber stiffener 7 is shaped in the form of a triangle in cross section and that the rigidity of the rubber stiffener 7 is decreased gradually from the bead core 6 to the radial direction R. In addition, the modulus of elasticity of the upper rubber stiffener 7b is smaller than that of the lower rubber stiffener 7a and they are both shaped in the form of a triangle in cross section and connected with each other. Accordingly, even if the number of the chafer plies is increased and the rigidity of the bead portion 4 is relatively high, the bending rigidity of the bead portion 4 will not become high excessively and will vary smoothly in the radial direction R. Furthermore, the radially outermost end 5a of the fold-back portion 5b of the carcass 5 is disposed adjacent the upper rubber stiffener 7b. Accordingly, the rigidities of the bead portion 4 are determined to vary suitably in the radial direction R and also the lateral direction A' in such a manner as to enhance extremely the durability of the bead portion 4.

While the above-noted embodiment has been illustrated and described in conjunction with the chafer 8 comprising three chafer plies 8a, 8b and 8c, it is noted that the chafer may comprise not less than three chafer plies. In this instance, cords of two adjacent chafer plies also cross one another.

While it has been described that the chafer angle $\theta_3$ is an angle between the chafer angles $\theta_1$ and $\theta_2$ and the chafer angles $\theta_1$, $\theta_2$ and $\theta_3$ are decreased gradually from the innermost chafer ply to the outermost chafer ply, it is noted that cords of chafer plies other than the chafer plies 8a and 8c having the chafer angles $\theta_1$ and $\theta_2$ may extend with respect to the radial direction R at angles of between the chafer angles $\theta_2$ and $\theta_1$, respectively. The maximum chafer angle $\theta_1$ is not limited to be the chafer angle of the innermost chafer ply.

Although it has been described that the rubber stiffener 7 comprises an upper rubber stiffener 7b of small modulus of elasticity and a lower rubber stiffener 7a of large modulus of elasticity, viz., two different rubber stiffeners of different moduli of elasticity, it is noted that the rubber stiffener 7 may comprise rubber stiffeners of hard rubbers which are the same in modulus of elasticity.

The description will hereinafter be made regards as results obtained from a durability test by comparing bead portions shown in FIGS. 7 to 9 with a bead portion shown in FIG. 10 and bead portions shown in FIGS. 11 to 13 with a bead portion shown in FIG. 14.

The results obtained from the durability test is shown in Table 1 and Table 2. The sizes of the tires in which the bead portions thereof are tested are two kinds of 11R22.5 and 11/70R22.5. The chafer plies 8a, 8b and 8c tested are different in chafer angle from one another and the rubber stiffeners are different in construction from one another. The Table 1 and the bead portions shown in FIGS. 7 to 10 are the case of the tire size 11R22.5, while the Table 2 and the bead portions shown in FIGS. 11 to 14 are the case of the tire size 11/70R22.5. Each of the chafer plies of the chafer 8 comprises rubberized nylon cords of 1260 denier/2. The number of the nylon cords is 41.4 piece/50 mm, and modulus of elasticity of the covering rubber of the nylon cord is 56 kg/cm$^2$ at an elongation of 100%. The ratio of the chafer height h to the fold-back height H is 1.8. In the upper rubber stiffener 7b is employed a soft rubber having modulus of elasticity of 20 kg/cm$^2$ at an elongation of 100%, while in the lower rubber stiffener 7a is employed a hard rubber having modulus of elasticity of 105 kg/cm$^2$ at an elongation of 100%. In the bead portions of FIGS. 7, 10 and 14, however, the soft rubber is only employed in the lower and upper rubber stiffeners 7a and 7b.

Figure 7:
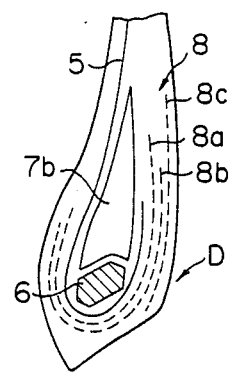
FIGS. 7 to 9 are enlarged part-sectional views showing other bead portions constructed in accordance with the present invention, the chafer angles thereof being different from one another.

Referring to Table 1 and Table 2, a chafer angle "R80" indicated there is intended to indicate that the cords of the chafer ply extend rightward upwardly at an angle of 80° with respect to the radial direction when viewed from the outside of the bead portion, viz., a direction indicated by arrow D in FIG. 7. A chafer angle "L60" is intended to indicate that the cords of the chafer ply extend leftward upwardly at an angle of 60° with respect to the radial direction. A word "Durability" is intended to indicate a travelling distance of the tire until crack occurs in the bead portion of the tire. The travelling distance is measured by using a drum testing machine under predetermined condition and the travelling distance of the tires shown in FIGS. 10 and 14 is indicated as 100 by an index number.

TABLE 1

Figure 8:
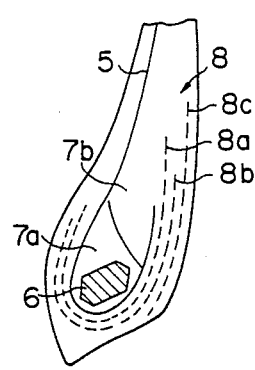
Figure 9:
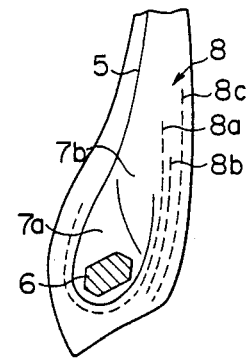
Figure 10:
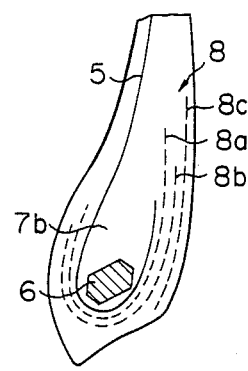
FIG. 10 is an enlargement of a bead portion in which cords of the chafer plies thereof extend at an angle of 60° with respect to the radial direction.

|  |  | Bead Portion of FIG. 7 | Bead Portion of FIG. 8 | Bead Portion of FIG. 9 | Bead Portion of FIG. 10 |
|---|---|---|---|---|---|
| Cord Direction of Chafer Ply and Chafer Angle (degree) | 8a | R80 | R80 | R60 | R60 |
|  | 8b | L60 | L60 | L45 | L60 |
|  | 8c | R45 | R45 | R80 | R60 |
| Kind of Rubber Stiffener | 7b | Soft Rubber | Soft Rubber | Soft Rubber | Soft Rubber |
|  | 7a |  | Hard Rubber | Hard Rubber |  |
| Durability (index number) |  | 125 | 135 | 120 | 100 |

TABLE 2

Figure 11:
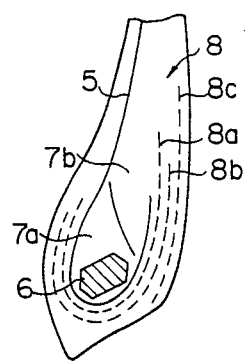
FIGS. 11 to 13 are views substantially similar to FIGS. 7 to 9, except that the bead portions of FIGS. 11 to 13 are different in tire size from those of FIGS. 7 to 9.
Figure 12:
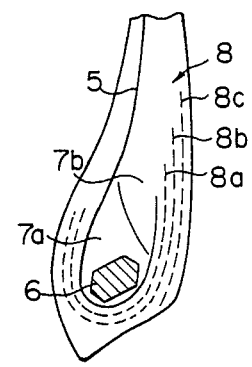
Figure 13:
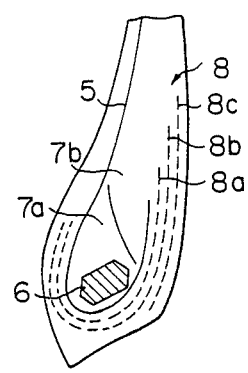
Figure 14:
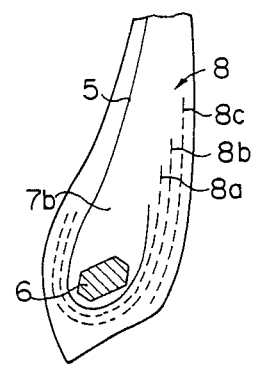
FIG. 14 is a view similar to FIG. 10, except for the tire size.

|  |  | Bead Portion of FIG. 11 | Bead Portion of FIG. 12 | Bead Portion of FIG. 13 | Bead Portion of FIG. 14 |
|---|---|---|---|---|---|
| Cord Direction of Chafer Ply and Chafer Angle (degree) | 8a | R80 | R80 | R75 | R60 |
|  | 8b | L60 | L45 | L50 | L60 |
|  | 8c | R45 | R60 | R48 | R60 |
| Kind of Rubber | 7b | Soft Rubber | Soft Rubber | Soft Rubber | Soft Rubber |
| Stiffener | 7a | Hard Rubber | Hard Rubber | Hard Rubber |  |
| Durability (index number) |  | 140 | 130 | 125 | 100 |

It will be understood from Table 1 and Table 2 that the bead portions of FIGS. 8 and 11 are most excellent in the "Durability" than the other bead portions. The chafer of FIGS. 8 and 11 comprises three chafer plies which are equal in number to the chafer plies of FIGS. 10 and 14 wherein the chafer angles thereof are 60° with respect to the radial direction. The chafer angles of the innermost chafer plies 8a and 8a of FIGS. 8 and 11 are R80°, respectively, which is within the chafer angle $\theta_1$ ranging from 70° to chafer angles of the outermost chafer plies 8c and 8c of FIGS. 8 and 11 are R45°, respectively, which is within the chafer angle $\theta_2$ ranging from 35° to 55°. In addition, the angles of intermediate chafer plies 8b and 8b of FIGS. 8 and 11 are L60°, respectively, which is an angle between the chafer angles of the innermost chafer ply 8a and the outermost chafer ply 8c, and thus the chafer angles are decreased gradually from the innermost ply to the outermost ply. It will be understand from these embodiments of FIGS. 8 and 11 that the reinforcing effect of the bead portion is obtained without the necessity of increasing the number of the chafer plies as compared with the conventional tires of the chafer angle 60° by arranging properly the chafer angle of the chafer ply in the direction inhibiting the deformations of the bead portion and accordingly the durability is enhanced extremely under the same load condition.

Figure 15:
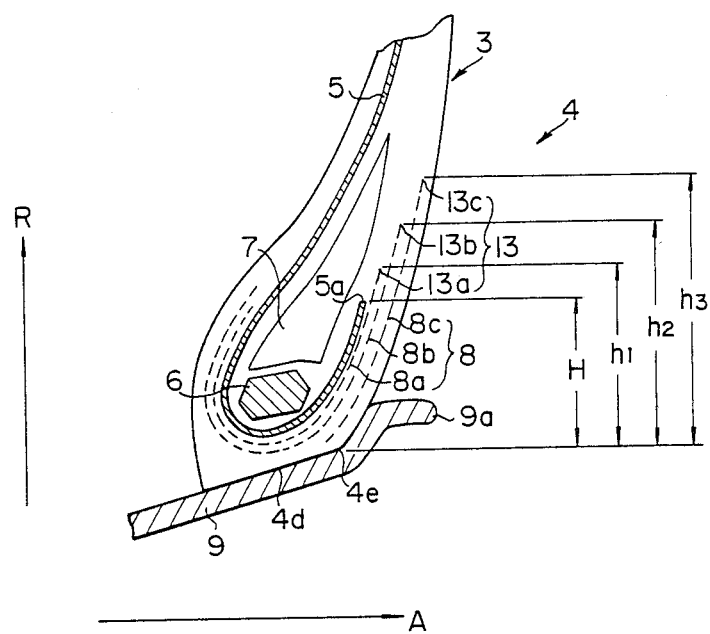
FIG. 15 is an enlargement of the bead portion shown in FIG. 2.

As noted above with FIGS. 4 and 5, in the case of the chafer angel $\theta$ of between 70° and 90°, the circumferential rigidity of the bead portion 4 is relatively high and consequently the inhibition of the bending deformation is most effective. In the case of the chafer angel $\theta$ of between 35° and 55°, the shearing rigidity of the bead portion 4 is substantially highest and consequently the inhibition of the shearing deformation is most effective. Accordingly, as shown in FIG. 15, in the case that the chafer 8 comprises at least first, second and third chafer plies 8a, 8b, and 8c disposed around the carcass 5 to reinforce the bead portion 4, the chafer angles $\theta_1$ and $\theta_2$ of the first and second chafer plies 8a and 8b can be both selected between 35° and 55° to provide high shearing rigidity of the bead portion 4. The chafer angle $\theta_3$ of the third chafer ply 8c can be selected between 70° and 90° to provide maximum circumferential rigidity of the bead portion 4. In this way, the shearing and circumferential rigidities of the bead portion 4 can be made high effectively at the same time.

The detailed description will now be made regards as how radially outermost ends of chafer plies of the bead portion influence the reinforcing effect and durability of the bead portion in conjunction with FIG. 15.

In FIG. 15, a chafer height $h_1$ is a distance from a laterally outward and radially outermost end 13a of the first chafer ply 8a to a heel point 4e at which a bead base 4d of the bead portion 4 and a flange portion 9a of a rim 9 having mounted the bead base 4d thereon are intersected with each other. A chafer height $h_2$ is a distance from a laterally outward and radially outermost end 13b of the second chafer ply 8b to the heel point 4e. A chafer height $h_3$ is a distance from a laterally outward and radially outermost end 13c of the third chafer ply 8c to the heel point 4e. A fold-back height H is a distance from a radially outermost end 5a of the carcass 5 to the heel point 4e. In this case, unless the radially outermost ends 13a and 13b of the first and second chafer plies 8a and 8b each having high shearing rigidity extend ahead of the radially outermost end 5a of the carcass 5 so as to cover the end 5a of the carcass 5, the occurrence of the failure of the end 5a is not prevented effectively. More particularly, in the case the $h_1/H$ ratio and the $h_2/H$ ratio are less than 1, cracks occur at the radially outermost end 5a of the carcass 5. In addition, in the case the radially outermost ends 13a and 13b extend excessively into the side portion 3, failure also occurs at the vicinities of the ends 13a and 13b having high shearing rigidities because flexible region of the side portion 3 is necessarily narrowed due to the ends 13a and 13b excessively extended. It is thus preferable that the $h_1/H$ and $h_2/H$ ratios should not exceed 2.

In the case the radially outermost end 13c of the third chafer ply 8c having high circumferential rigidity is lower than the radially outermost ends 13a and 13b of the first and second chafer plies 8a and 8b each having high shearing rigidity, cracks tend to occur at the vicinities of the radially outermost ends 13a and 13b. It is thus preferable that the radially outermost end 13c of the outermost chafer ply 8c be taller than the radially outermost ends 13a and 13b of the innermost and intermediate chafer plies 8a and 8c. Namely, it is preferable that the chafer height $h_3$ be taller than the other chafer heights $h_1$ and $h_2$. If the radially outermost end 13c of the third chafer ply 8c extends excessively to an intermediate portion of the side portion 3 in which the large deformation of the tire is produced, cracks will tend to occur from the radially outermost end 13c. It is thus preferable that the $h_3/H$ ratio should not exceed 2.5. The foregoing description is not limited to the chafer comprising three chafer plies but is the same to the case of a chafer comprising more than three chafer plies.

As described hereinabove, it is preferable to provide the radially outermost ends 13a and 13b of the first and second chafer plies 8a and 8b each having high shearing rigidity at a position higher than the radially outermost end 5a of the carcass 5 and the radially outermost end 13c of the third chafer ply 8c having high circumferential rigidity at a position higher than the radially outermost ends 13a and 13b. In this instance, in order to avoid the concentration of stress between the radially outermost ends of the chafer comprising three or four chafer plies, it is preferable that the radially outermost ends be spaced apart more than 5 mm in the radial direction R. Further, in the case a chafer comprises more than three chafer plies, on the contrary, the chafer sometimes lowers the durability of the bead portion because the bead portion is enlarged in thickness and the heat generated in the bead portion is proportionally increased.

In conjunction with the results described with FIG. 15, an embodiment of the present invention shown in FIG. 16 will now be described in detail. A radial tire used in this embodiment is a tubeless tire in which the tire size thereof is 11/70R22.5 and the aspect ratio thereof is approximately 0.7.

A bead portion 14 shown in FIG. 6 comprises a bead core 16 disposed circumferentially of the tire on a plane which is substantially perpendicular to a lateral direction A' substantially parallel to a rotational axis of the tire, a rubber stiffener 17 disposed radially outwardly of the bead core 16 and at least one carcass 15 having a fold-back portion 15b folding back at the bead core 16 in a radial direction R substantially perpendicular to the lateral direction A' to cover the bead core 16 and in part the rubber stiffener 17. The rubber stiffener 17 is shaped in the form of a triangle in cross section and comprises a lower rubber stiffener 17a disposed on the bead core 16 and an upper rubber stiffener 17b disposed on the lower rubber stiffener 17a. Modulus of elasticity of the upper rubber stiffener 17b is smaller than that of the lower rubber stiffener 17a. The fold-back portion 15b of said carcass 15 has a radially outermost end 15a disposed adjacent the upper rubber stiffener 17b. The bead portion 14 further comprises a chafer generally designated by reference numeral 18 which is disposed around the carcass 15 to reinforce the bead portion 14. The chafer 18 is constituted by rubberized nylon cords each having 1260 denier/2. The number of the nylon cords is 41.4 pieces/50 mm, and modulus of elasticity of a covering rubber of the nylon cord is 56 kg/cm$^2$ at an elongation of 100%. The chafer 18 comprises at least first or innermost, second or intermediate and third or outermost chafer plies 18a, 18b and 18c which have a plurality of first parallel cords, a plurality of second parallel cords and a plurality of third parallel cords, respectively. The first, second and third chafer plies 18a, 18b and 8c are disposed in order from the bead core 16 to an outer surface 14a of the bead portion 14. Two adjacent cords of the first, second and third cords cross one another.

The cords of the first, second and third chafer plies 18a, 18b and 18c extend with respect to the radial direction R at angles of $\theta_1$, $\theta_2$ and $\theta_3$, respectively, defined by the following equations, $$35° \leq \theta_1 \leq 55°,$$

$$35° \leq \theta_2 \leq 55°$$

$$70° \leq \theta_3 < 90°$$

wherein the angle $\theta_1$ indicates a first chafer angle $\theta_1$ of the innermost chafer ply 18a disposed adjacent the carcass 15 and the angle $\theta_2$ indicates a second chafer angle $\theta_2$ of the intermediate chafer ply 18b overlying the first chafer ply 18b and the angle $\theta_3$ indicates a third chafer angle $\theta_3$ of the outermost chafer ply 18c overlying the intermediate chafer ply 18b. In this embodiment, the chafer angles $\theta_1$, $\theta_2$ and $\theta_3$ are R50, L50 and R78, respectively.

A chafer height h generally designated by reference h is a distance from an a laterally outward and radially outermost end of a chafer ply to a heel point 14e at which a bead base 14d of the bead portion 14 and a flange portion 19a of a rim 19 are intersected with each other. Chafer heights $h_1$, $h_2$ and $h_3$ are distances in the radial direction R from laterally outward and radially outermost ends 23a, 23b and 23c of the first, second and third chafer plies 18a, 18b and 18c to the heel point 14e, respectively. A fold-back height H is a distance from the radially outermost end 15a of the fold-back portion of the carcass 15 to the heel point 14e. The heights are defined by the following equations, $$1 < \frac{h_1}{H} \leq 2.0, \ 1 < \frac{h_2}{H} \leq 2.0, \ \frac{h_3}{H} \leq 2.5,$$

The third height $h_3$ is taller than the other chafer heights $h_2$ and $h_1$. In the embodiment shown in FIG. 16, the fold-back height H is 38 mm. The chafer heights $h_1$, $h_2$ and $h_3$ are 53 mm, 63 mm and 75 mm, respectively. The $h_1/H$, $h_2/H$ and $h_3/H$ ratios are 1.4, 1.7 and 2.0, respective outermost ends 23a, 23b and 23c are spaced apart with one another more than 5 mm to avoid the concentration of stress therebetween.

The description will hereinafter be made regards as results obtained from a durability test by comparing the bead portion of the present invention shown in FIG. 16 with the bead portion of the prior art shown in FIG. 17.

The results obtained from the durability test is shown in Table 3. A tire used in the durability test is a tubeless tire having a tire size of 11/70R22.5. The construction of the bead portion of FIG. 16 is substantially identical to that of the bead portion of FIG. 17, except for the chafer angles of the chafer plies. In Table 3, a chafer angle "R50" shown there is intended to indicate that the cords of the chafer ply extend rightward upwardly at an angle of 50° with respect to the radial direction R when viewed from the outside of the bead portion. A chafer angle "L50" is intended to indicate that the cords of the chafer ply extend leftward upwardly at an angle of 60° with respect to the radial direction R. A word "durability" is intended to indicate a travelling distance of the tire until crack occurs in the bead portion of the tire. The travelling distance is measured by using a drum testing machine under predetermined condition and the travelling distance of the prior art tire is indicated as 100 by an index number.

TABLE 3

Figure 16:
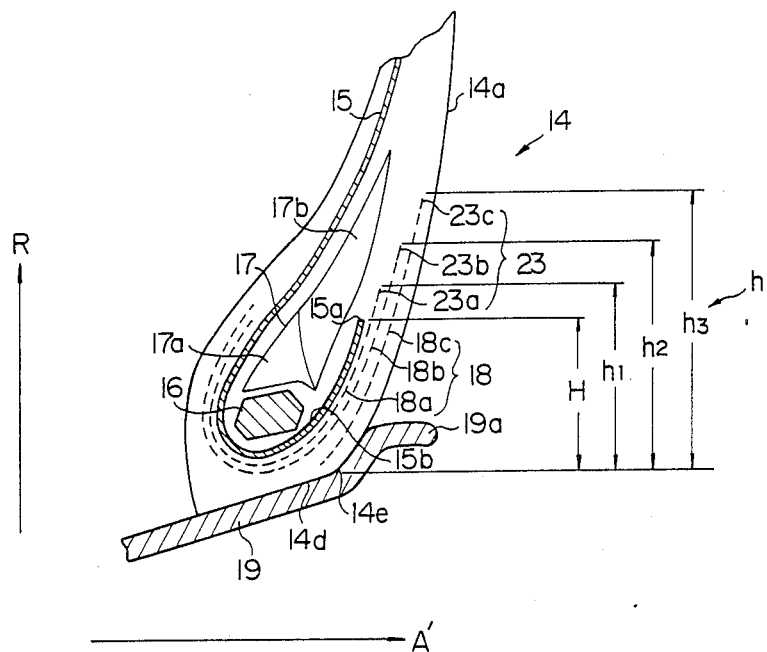
FIG. 16 is an enlarged part-sectional view showing a second preferred embodiment of the bead portion constructed in accordance with the present invention.
Figure 17:
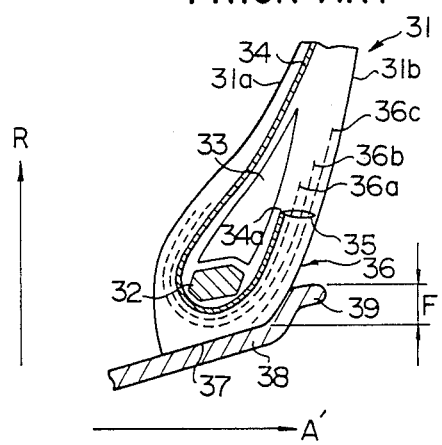
FIG. 17 is an enlarged part-sectional view of a bead portion of the prior art pneumatic radial tire for heavy duty vehicles.

| | | Bead Portion of FIG. 16 | Bead Portion of FIG. 17 |
|---|---|---|---|
| Cord Direction of Chafer Ply and Chafer Angle (degree) | $\theta_1$ | R50 | R60 |
| | $\theta_2$ | L50 | L60 |
| | $\theta_3$ | R78 | R60 |
| Ratio of Chafer Height to Fold-back Height of Carcass | $h_1/H$ | 1.4 | 1.4 |
| | $h_2/H$ | 1.7 | 1.7 |
| | $h_3/H$ | 2.0 | 2.0 |
| Kind of Rubber Stiffener | Upper Stiffener | Soft Rubber | Soft Rubber |
| | Lower Stiffener | Hard Rubber | Hard Rubber |
| Durability (index number) | | 170 | 100 |

What is claimed is:

1. A pneumatic radial tire for heavy duty vehicles having a pair of bead portions each comprising:
   a bead core disposed circumferentially of the tire on a plane which is substantially perpendicular to a rotational axis of the tire,
   a rubber stiffener disposed radially outwardly of said bead core and shaped in the form of a triangle in cross section,
   at least one carcass having a fold-back portion folding back at said bead core in a radial direction substantially perpendicular to said rotational axis to cover said bead core and in part said rubber stiffener, and at least first, second and third chafer plies disposed around said carcass to reinforce said bead portion and having embedded therein a plurality of first parallel cords, a plurality of second parallel cords and a plurality of third parallel cords, respectively, with the cords of adjacent plies arranged to cross each other in diagonally opposite directions, the cords of said first, second and third chafer plies being all composed of organic textile material, said cords of said first, second and third chafer plies extending with respect to said radial direction at chafer angles of $\theta_1$, $\theta_2$ and $\theta_3$, respectively, defined by the following equations, $35° \leq \theta_1 \leq 55°$, $35° \leq \theta_2 \leq 55°$ $70° \leq \theta_3 < 90°$, said first, second and third chafer plies having a first chafer height $h_1$ measured in said radial direction from a laterally outward and radially outermost end of said first chafer ply to a heel point at which a bead base of said bead portion and a flange portion of a rim having mounted said bead base thereon are intersected with each other, a second chafer height $h_2$ measured in said radial direction from a laterally outward and radially outermost end of said second chafer ply to said heel point and a third chafer height $h_3$ measured in said radial direction from a laterally outward and radially outermost end of said third chafer ply to said heel point, respectively, said carcass having a fold-back height $H$ measured in said radial direction from a radially outermost end of said fold-back portion thereof to said heel point, the first, second and third chafer heights $h_1$, $h_2$ and $h_3$ being selected within ranges defined by the following equations, $$1 < \frac{h_1}{H} \leq 2.0,\ 1 < \frac{h_2}{H} \leq 2.0,\ \frac{h_3}{H} \leq 2.5,$$

said third chafer height $h_3$ which has the maximum chafer angle $\theta_3$ with respect to said radial direction being radially taller than the other chafer heights $h_1$ and $h_2$ respectively having said chafer angles $\theta_1$ and $\theta_2$ each smaller than said chafer angle $\theta_3$.

2. A pneumatic radial tire as set forth in claim 1, in which said rubber stiffener comprises a lower rubber stiffener disposed on said bead cord and an upper rubber stiffener disposed on said lower rubber stiffener, modulus of elasticity of said upper rubber stiffener being smaller than that of said lower rubber stiffener and in which said fold-back portion of said carcass has a radially outermost end disposed adjacent said upper rubber stiffener.

3. A pneumatic radial tire as set forth in claim 1, in which said first, second and third chafer plies are disposed in order from said bead core to an outer surface of said bead portion.

4. A pneumatic radial tire for heavy duty vehicles as set forth in claim 1, in which said first, second and third cords of said first, second and third chafer plies are all made of nylon.

5. A pneumatic radial tire for heavy duty vehicles as set forth in claim 1, in which said chafer ply having the maximum chafer angle is arranged axially outwardly of the other said chafer plies.

6. A pneumatic radial tire for heavy duty vehicles as set forth in claim 1, in which said chafer ply having the maximum chafer angle has a radially innermost end which is arranged axially outwardly of the vicinity of a center of said bead core.

7. A pneumatic radial tire for heavy duty vehicles as set forth in claim 1, in which said at least first, second and third chafer plies are disposed around said carcass to cover the end of said fold-back portion of said carcass in such a manner that surroundings of said carcass in said bead portion is reinforced.

* * * * *